June 19, 1951  J. FOX  2,557,645

AUTOMATIC RECORD-CHANGING PHONOGRAPH MECHANISM

Filed Sept. 30, 1946  9 Sheets-Sheet 1

INVENTOR.
Joseph Fox,
BY Morsell & Morsell
ATTORNEYS

June 19, 1951 J. FOX 2,557,645
AUTOMATIC RECORD-CHANGING PHONOGRAPH MECHANISM
Filed Sept. 30, 1946 9 Sheets-Sheet 2

INVENTOR.
BY Joseph Fox,
Morsell & Morsell
ATTORNEYS.

June 19, 1951  J. FOX  2,557,645
AUTOMATIC RECORD-CHANGING PHONOGRAPH MECHANISM
Filed Sept. 30, 1946  9 Sheets-Sheet 3

INVENTOR.
Joseph Fox,
BY
Morsell & Morsell
ATTORNEYS.

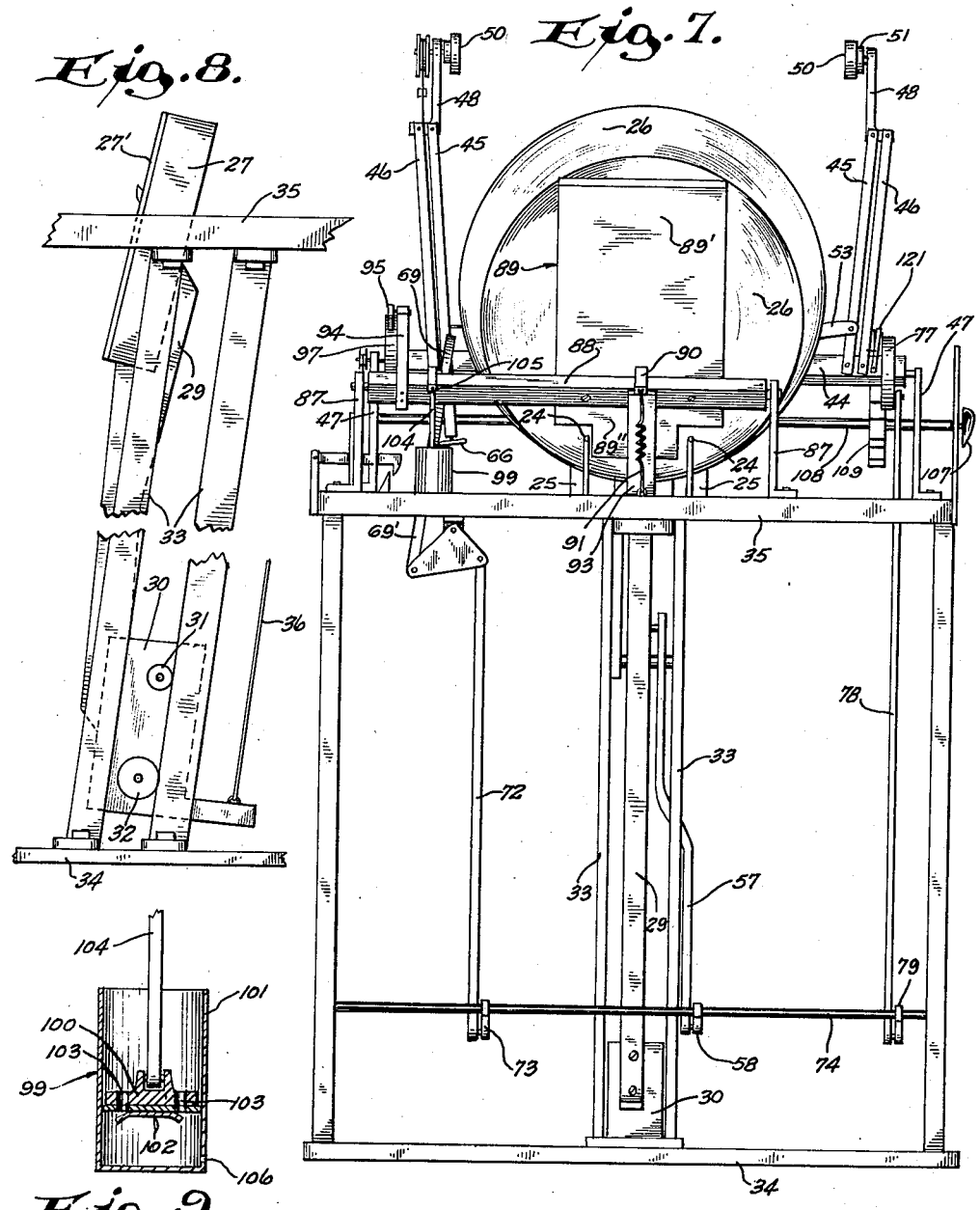

June 19, 1951  J. FOX  2,557,645

AUTOMATIC RECORD-CHANGING PHONOGRAPH MECHANISM

Filed Sept. 30, 1946  9 Sheets-Sheet 7

INVENTOR.
Joseph Fox,
BY Morsell & Morsell
ATTORNEYS.

June 19, 1951  J. FOX  2,557,645
AUTOMATIC RECORD-CHANGING PHONOGRAPH MECHANISM
Filed Sept. 30, 1946  9 Sheets-Sheet 8

INVENTOR.
Joseph Fox,
BY Morsell & Morsell
ATTORNEYS.

INVENTOR.
Joseph Fox,
BY Morsell + Morsell
ATTORNEYS.

Patented June 19, 1951

2,557,645

UNITED STATES PATENT OFFICE 2,557,645

AUTOMATIC RECORD-CHANGING PHONO-
GRAPH MECHANISM

Joseph Fox, Milwaukee, Wis.

Application September 30, 1946, Serial No. 700,273

12 Claims. (Cl. 274—10)

This invention relates to improvements in automatic record-changing phonograph mechanisms, and more particularly to a mechanism of the type designed for use in phonographs capable of playing series of records.

A primary object of the present invention is to provide a unitary, compact machine capable of handling all standard disc phonograph records, individual or in series, and of successively presenting said records to a common turntable for reproduction by any of the well-known devices such as pick-up arms utilizing a needle or stylus, the mechanism being capable of adjustment to either of the two standard disc record sizes, the presentation of records to the turntable being accomplished in such a variety of sequences as to permit the phonograph to play any of three standard types of record albums from beginning to end, without attention after the initial loading, and with either or both sizes of standard records.

More specifically, the improved record-changing mechanism is adapted to play in consecutive order, dependent upon the particular type of record series, any or all of the conventional and available series; as for instance, "turnover" albums, in which each record must be reversed after the playing of the first side thereof and is not changed until the second side has been played; the "automatic" albums, in which each record is played on only one side, until all records in the series have been so played, after which each record of said series is played on its reverse side, in the same order as was followed initially; and "drop automatic" albums, in which each record is played on one side, after which either the entire stack must be turned over, or the stacking must be accomplished in reverse, so that the next record surface played will be the reverse side of the record last played before such re-stacking was accomplished.

Another object of the invention is to provide in a record changer, a movable drawer susceptible of being pulled from the front of the cabinet, and which drawer contains a rack on which records designated for reproduction may be loosely stacked by the operator; and, following closure of the drawer the electrical current for operating the mechanism is turned on, whereupon the mechanism itself automatically functions to load a single record onto the photograph turntable and thereafter changes or reverses the records as predetermined by the operator according to the type of records or album being used, thereby materially minimizing manipulations required by the operator and lessening the possibility of faulty record loading.

A further specific object of the invention is to provide a phonograph record-changing apparatus which can perform a variety of actions, but which is controlled by simple, easily manipulated electrical switches.

A further object of the invention is to provide in a record changer mechanism of the class described, means whereby the electrical controls, once the same have been set by the operator, will thereafter continue their functions without further attention or manipulation.

A further object of the invention is to provide in a phonograph record changer, a record receiving drawer which is automatically locked as soon as the power is turned on and which remains locked until the power has been cut off, said arrangements being for the purpose of preventing an operator from removing the drawer and its contents at any time while the mechanism is functioning.

Another specific object of the invention is to provide in a mechanism of the class described, a novel cut-off switch, which, in the event of a mechanical failure on the part of the apparatus designed to present records to the turntable, will shut off the entire power supply instantly, thereby preventing damage to the records and further damage to the mechanism through continued faulty operation.

A further object of the invention is to provide, in a record changer of the class described, novel means for mechanically lifting single records from the stack in a drawer, and raising the same to a predetermined height on an arc described from the turntable spindle, said means being adapted to accommodate either of the two standard sizes of record.

Another feature of the invention is the provision in a record changer of the class described, of record shifting means arranged to engage records only at their edges so as to prevent damage to record faces, said means also operating to remove individual records from the photograph turntable after playing, and to invert each record immediately upon its removal from the turntable.

Still another object of the invention is to provide a record shifting instrumentality by which each individual record, following its removal from the phonograph turntable, is, according to the preselection of the operator, either returned to the record drawer, or is held until all of the other records in its series (if the series is of the "drop automatic" type) have been stacked upon the first record in reverse order, following which the mechanism returns the entire group of records to the record drawer for the subsequent playing of the reverse faces, in reverse order.

A further feature of the invention is to provide in a record changer, an instrumentality mentioned above designed so that records engaged with it, either singly or in groups, are thereafter returned to the record drawers in such a manner as to leave the records in exact position for reloading upon the turntable, or for removal from the drawer.

A further object of the invention is to provide a record-changer capable of many selective actions; yet so compact as to be easily housed within the type of cabinet known as a "console" type and commonly furnished for radio-phonographs.

Still another object of the invention is to provide a record-changing apparatus able to perform the complicated and diverse series of actions described or mentioned above; yet relatively simple and inexpensive to manufacture.

Another object of the invention is to provide a record-changing mechanism of the type described and so constructed that operation thereof is practically foolproof as to either the operator or mechanical failure.

A further object of the invention is to provide an automatic record-changing phonograph mechanism which is of relatively simple and inexpensive construction, which is selective and automatic in its operation, which is strong and durable, and which is well adapted for the purposes described.

With the above and other objects in view, the invention consists of the improved automatic record-changing phonograph mechanism, and its parts and combinations as set forth in the claims and all equivalents thereof.

In the accompanying drawings in which the same reference characters indicate the same parts in all of the views:

Fig. 7 is a view taken on lines 7—7 of Fig. 2;

Fig. 8 is an enlarged fragmentary detail front view of the record lifting mechanism;

Fig. 9 is an enlarged detail sectional view of a check or snubber device included in the apparatus;

In its broadest aspect the present invention contemplates, in combination with a phonograph or record player, an improved automatic record changing mechanism. The latter is selective and considerably more adaptable than conventional record changers now on the market in that it is susceptible of presenting to the phonograph turntable for reproduction series of phonograph records regardless of whether the same comprises the so-called "turnover" album, the "automatic" album, or the "drop automatic" album.

Figure 1:
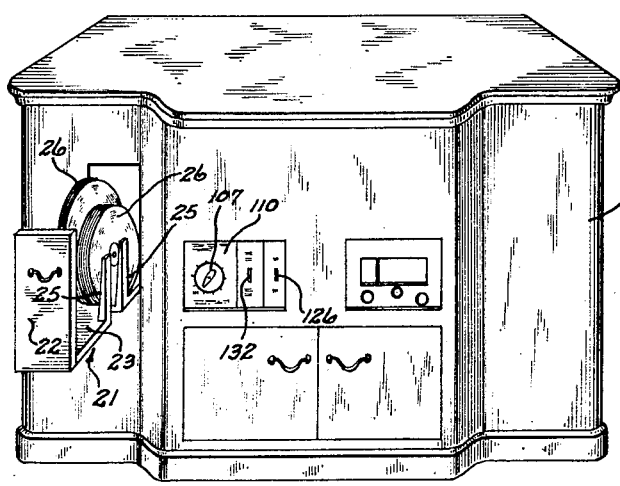
Fig. 1 is a front view of a radio-phonograph console cabinet equipped with the improved record-changing mechanism and showing the record holding drawer withdrawn.
Figure 10:
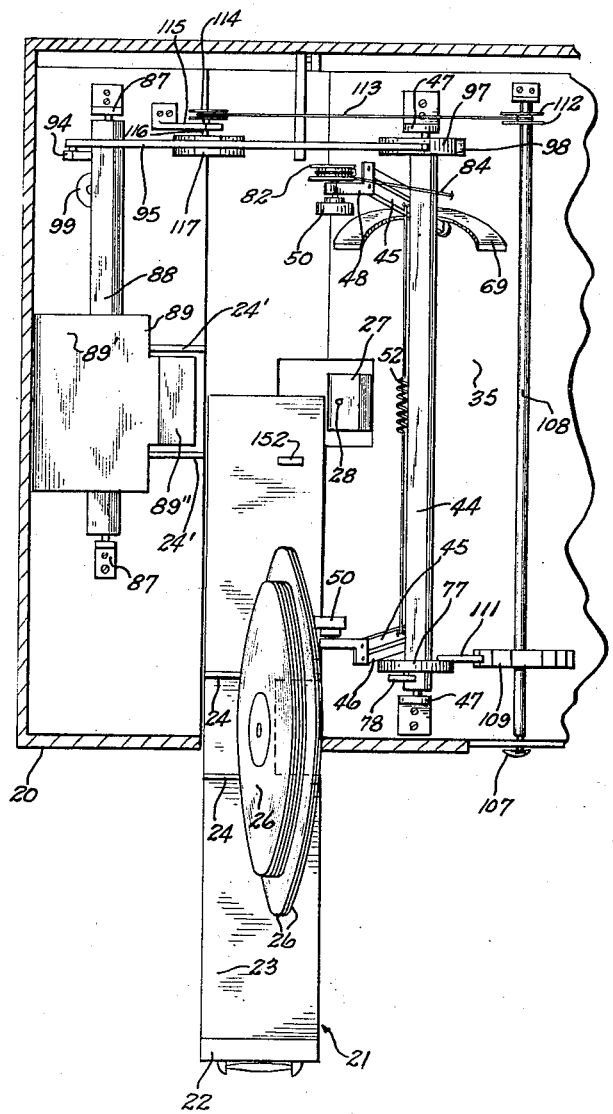
Fig. 10 is a fragmentary top view of the record changing apparatus with the record holding drawer in its partly withdrawn position and with the mechanism in its normal "at rest" position, parts of the enclosing cabinet being broken away and in section.

The better types of automatic record changing phonograph mechanisms are housed in attractive cabinets. Hence, in the present embodiment, the improvements have been shown as being housed within a console cabinet 20 (see Fig. 1) on a front wall of which are suitable control devices for the phonograph and record changer, and for a radio (if the instrument is a combination radio-phonograph). The relative location of the improved record-changing mechanism to the phonograph mechanism, within the cabinet, will be clear from Fig. 2. Consequently, it will be evident that the left side of the cabinet 20 houses a plural record receptacle which in the present invention takes the form of a drawer 21. This drawer is adapted to be pulled forwardly outwardly of the front of the cabinet for loading purposes, as shown in Figs. 1 and 10. In addition to a front member 22 which closes the cabinet drawer opening when the drawer is in its inner position, the record drawer includes a flat horizontal bottom 23 on which there are, intermediate its ends, a pair of transverse slips rods 24 (see Fig. 10) which are downwardly inwardly inclined. Carried by the bottom of the drawer adjacent the inner ends of the slip rods 24 are upstanding retaining poles 25 whose effective inner faces are inclined slightly from vertical. The inclination of the slip rods 24 causes records resting thereon to slip or slide downwardly until the records rest against and are supported by the inclined faces of the retaining poles 25. The record drawer is loaded when it is withdrawn and the desired number of records are simply placed substantially upright on the slip rods so that they lean against the retaining poles 25. As will appear from Figs. 6, 7 and 10, the slip rods 24 are parallel and are spaced apart a distance sufficient to accommodate phonograph records of either of the standard sizes.

Figure 2:
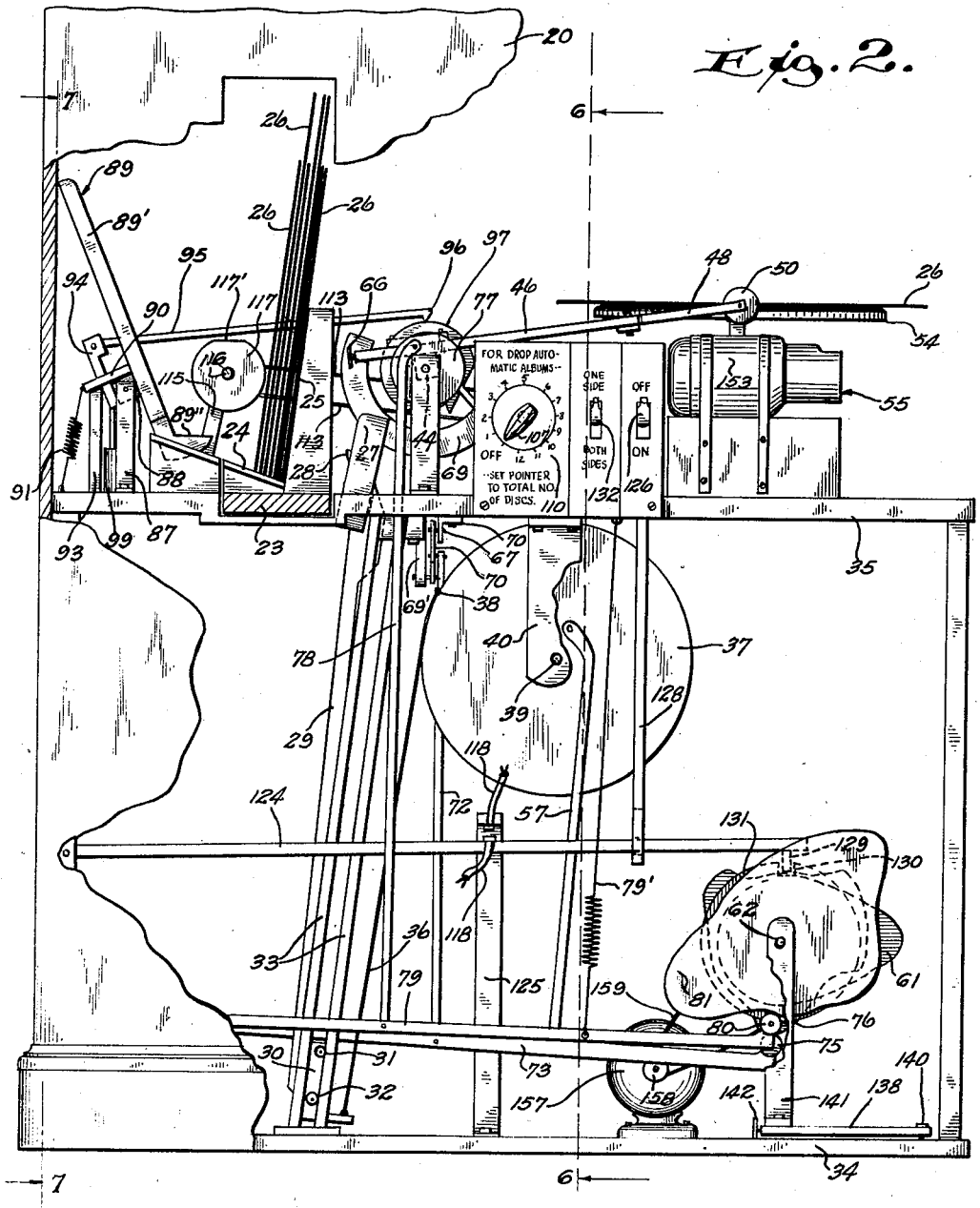
Fig. 2 is an enlarged front view of the improved phonograph record changing mechanism, parts of the enclosing cabinet being broken away and parts being shown in section, said view also showing the record holding drawer in closed position with records of a series or album in proper position therein and with one record on the phonograph turntable engaged by the record shifting mechanism.
Figure 4:
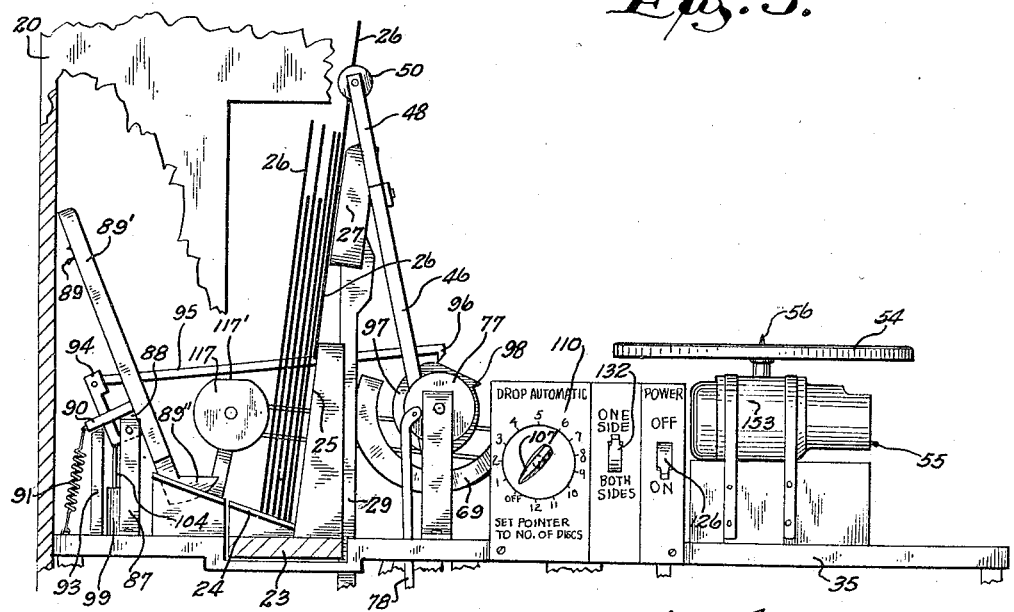
Fig. 4 is a similar fragmentary view, partly in section, illustrating another position of the record shifting mechanism.

The assemblage includes a mechanism for lifting individual records 26 from the previously described substantially upright position in the drawer 21 to an elevated position for subsequent handling. This mechanism, termed a "record lifter," is best shown in Figs. 2, 4 and 8. A flat surface block 27 has rigidly affixed to its outermost face a spur or protuberance 28. By means later to be described, the block may be caused to rise in a manner so that the spur 28 on the block engages the adjacent face of the forwardmost record 26 in the drawer 21, the movement being such that the block 27 moves between the retaining poles 25. Ultimately, the spur 28 on the block will enter the central aperture in the innermost record, and, as elevation of the block 27 continues the engagement between the spur 28 and the record aperture is such that the record will be lifted from the stack to the position shown in Fig. 4. When the record is lifted entirely free of the stack it is supported temporarily solely by the spur 28 and the engaged surface of the record 26 is protected by resting against a felt or protective surface 27' on the block 27 (see Fig. 8). With the removal of the forwardmost record 26 from the stack, the remaining records in the stack will simply gravitate downwardly on the slip rods 24 so that the then forward record will rest against the retaining poles 25.

As will appear from Fig. 8, the block 27 is affixed to the upper end of an elongated bar 29, and the latter carries at its lower end another block 30 having on faces thereof pairs of rollers or wheels 31 and 32 of different diameters. The wheels on the lower block 30 are adapted to ride between a pair of upwardly extending rigidly mounted guide tracks 33, said tracks extending from the base 34 of the cabinet to an upper horizontal support 35. It will be noted that the effective surfaces of the guide tracks 33 are parallel to the surfaces of the records in the drawer 21 as supported by the retaining poles 25. As to the lower wheels 32, there is relatively slight clearance between the adjacent faces of the tracks 33, and as to the upper wheels 31, there is considerably more clearance.

An extension on the lower block 30 has affixed thereto the lower extremity of an elongated cable 36. The arrangement is such that leverage is exerted on the block 30 simultaneously with the application of the lifting force with the result that the lower block 30 is free to pivot on the lower wheels 32 until the upper wheels 31 contact the effective face of the track 33 which is furthest to the left relative to Fig. 8. This minimum amount of leverage or swinging movement is transmitted, at the proper time, to the upper block 27 to move the spur 28 into contact with the innermost record 26 in the drawer 21. The cable 36 extends between the extension on the block 30 and an elevated large pulley 37 to which the upper end of the cable is attached, as at 38. The large pulley 37 is revolubly mounted on a pin or shaft 39 carried by arms 40 depended from the upper partition or support 35. There is pivotally mounted to the pulley 37 the upper end of a lever 57 whose lower extremity is pivotally mounted to a lower lever 58 having one end pivoted to a frame upright 59. The opposite extremity of the lower lever 58 revolubly carries a cam roller 60 adapted to ride along certain eccentric surface portions of a cam 61. Through this arrangement, when the cam shaft 62 is being driven so as to turn the cam 61, the outer end of the lever 58 will be depressed, pulling downwardly on the lever 57 to turn the pulley 37 in a direction which will tend to wind the cable 36 thereon. Consequently, the pull effected by the winding of cable 36 is transmitted to the lower block 30 to tilt said block, as previously described, and to raise the same and the parts connected thereby which include the bar 29 and the upper block 27. According to the means above described, therefore, the upper block 27 is operated so as to move upwardly along the innermost record 26 to project its spur 28 into the record aperture, following which the engaged record is moved upwardly relative to the stack for separation from the stack and for engagement by a gripper mechanism to be subsequently described.

Figure 6:
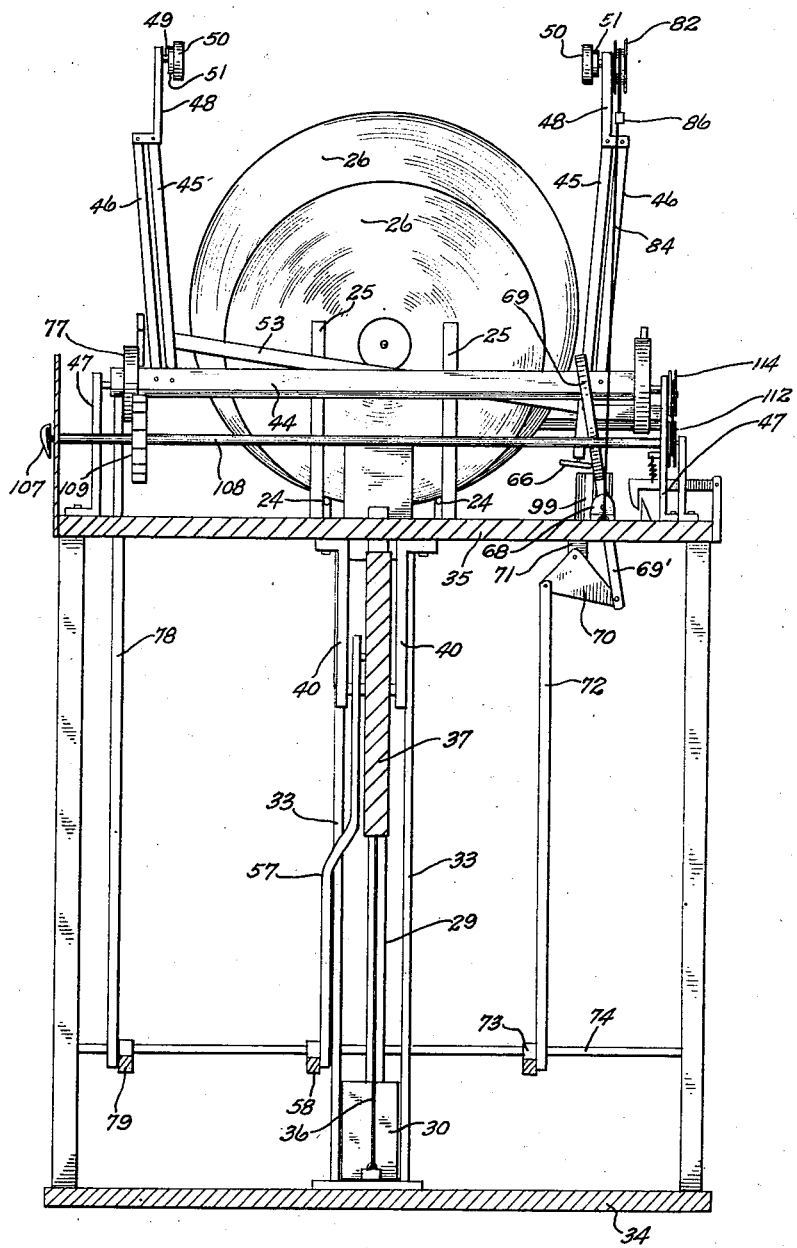
Fig. 6 is a vertical sectional view taken on line 6—6 of Fig. 2 with the enclosing cabinet omitted.

The gripper mechanism, now to be explained, is mounted on and moved by a shaft 44 whose relative location to the parts previously described will be especially apparent from Figs. 2 and 6, the shaft 44 extending fore and aft relative to the cabinet 20 and being disposed to the right (relative to Fig. 2) of the record drawer 21. The gripper mechanism is shown in detail in Fig. 13 and comprises two pairs of spaced arms 45 and 46 all of which have their lower end portions pivotally mounted on the shaft 44. The latter has reduced end portions which are journalled in upright bearing brackets 47 (see Figs. 6 and 7) mounted on the upper support 35. Pivotally carried by the upper ends of the arms 45 and 46 are a pair of separated, right angularly shaped bearing brackets 48 in which are revolubly mounted stud shafts 49 parallel to the lower main shaft 44. On the projecting inner ends of these stud shafts 49 are resilient discs or pads 50 adjacent the inner faces of which are spacers 51. An elongated spring 52 extended between lower end portions of the arms 45 normally exerts a pull on said arm so as to swing the outer ends of the same, which carry the brackets 48 and the pads 50, toward each other, for a closing effect. Equalization of the movement of the pairs of arms 45 and 46 is effected by an equalizing lever 53 having opposite ends thereof pivotally connected to the spaced arms 45 extended angularly between the same.

At this point it may be stated that the arms of the lifting mechanism are intended to engage opposite edge portions of a record 26 which was elevated from the stack in the drawer 21 through elevation of the block 27, in the manner shown in Fig. 4, it being understood that the pads 50 on the outer ends of the arms 45 actually contact the edge portions of the selected record, and the closing effect of the two arms 45 imposed by the spring 52 is such as to cause the selected record 26 to be firmly clamped between the pads 50. Following engagement with the elevated record, the shaft 44 is caused to revolve in a desired direction, by means later to be described, whereby the assemblage of Fig. 13, bearing the engaged record 26, swings in a clockwise direction relative to Fig. 4 and deposits the record horizontally onto the turntable 54 of the motor operated phonograph or record player. The latter is of conventional construction and will not be described in detail, but will be indicated generally by the reference numeral 55. It will further be understood that the parts are so located that when the record is deposited onto the phonograph turntable 54, the central aperture in the record will register with the central pin or projection 56 on the phonograph turntable. Upon deposit of the selected record onto the phonograph turntable, certain mechanism to be described is operated to cause a spreading of the outer ends of the arms 45 to release the deposited record. At this point it may further be stated that the gripper mechanism, including the movable arms 45, is so arranged that the arm-carried pads 50 are engageable and disengageable with phonograph records whether the same be of smaller size or of a larger size.

Figure 5:
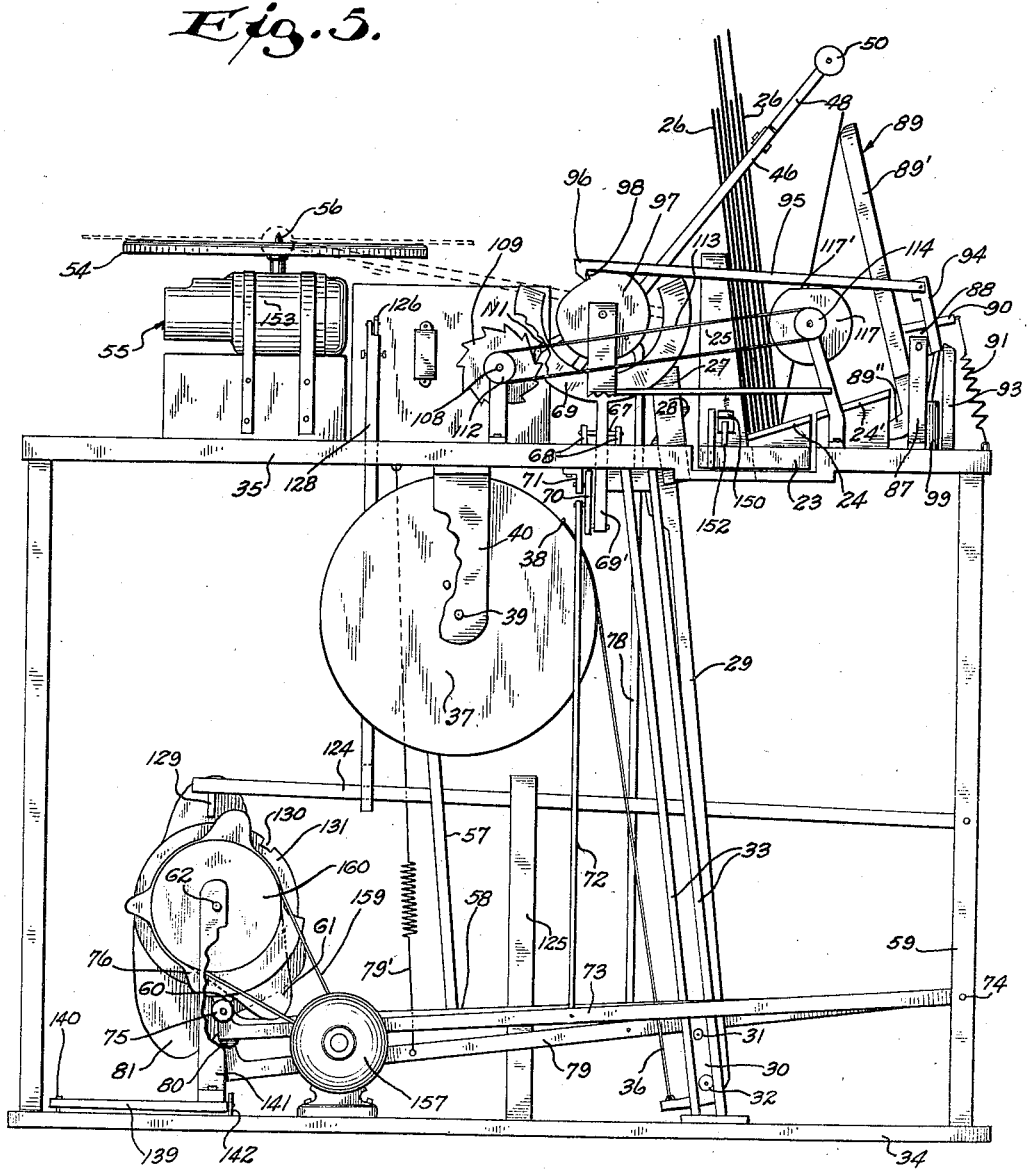
Fig. 5 is a view similar to Fig. 2 only viewing the mechanism from the reverse or rear side, the enclosing cabinet being omitted, and the record shifting mechanism being in still another position.

It has heretofore been noted that the assemblage which includes the gripper arms 45 is adapted to be operated so as to bring the pads 50 toward one another to engage a record and away from one another to disengage a record. The mechanism for accomplishing these movements includes the following: one of the arms 45 has a depending extension on which a small wheel 66 is revolubly mounted. Pivotally mounted on a pin 67 (see Fig. 5) carried by brackets 68 is the intermediate portion of the shank 69' of a Y yoke 69. The lower extremity of the portion 69' of the yoke 69 is pivotally attached to one end portion of a triangular lever 70 which is pivotally depended from a bracket plate 71. The third end of the triangular lever plate 70 has pivotally attached thereto the upper end of an elongated link 72. The lower end of the link 72 is pivotally attached to an intermediate portion of a substantially horizontal lever 73 and the latter is pivotally mounted on a lower horizontal shaft 74 journalled in the machine frame. The free end of the lever 73 revolubly carries a cam roller 75 adapted to ride along the periphery of another cam 76 fast on the previously mentioned cam shaft 62. Obviously, turning movement of the cam 76 is effective to depress the outer end portion of the lever 73 thereby pulling downwardly on the link 72 and turning the triangular lever plate 70 in a direction to swing the lower extension 69' of the Y-shaped yoke 69 outwardly. Because of the pivotal mounting of the last-mentioned member, its Y-shaped upper end portion 69 is thereby pivoted inwardly to engage the wheel 66 on the lower end of the arm 45. The resulting pressure will tend to force the arm 45 inwardly and as the arms 45 and 46 are interconnected, this will result in a spreading of the outer ends of the arms, against the tension of the spring 52, thereby separating the record gripping pads 50. The shape of the Y-member 69 is such that the above-described action will result regardless of where the wheel 66 may contact the member 69. It might be pointed out that it is necessary for the arms 45 to spread and release the record at the two lowest points of descent of the gripper mechanism on either side, and also when the outer ends of the gripper mechanism reach their highest point during the arc of swinging movement.

Figures 13, 14:
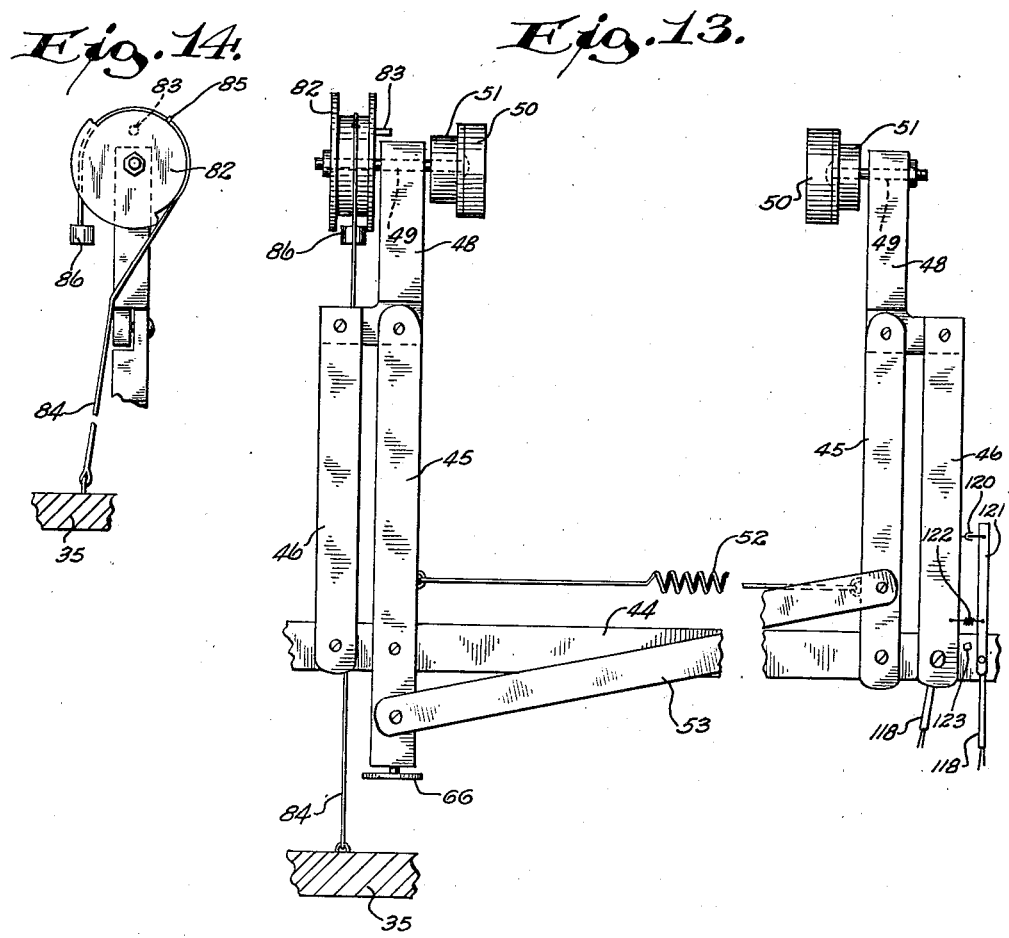
Fig. 13 is an enlarged, fragmentary detail view of the record shifting arm mechanism in raised position, the view being otherwise at right angles to the showing in Fig. 2.
Fig. 14 is an enlarged fragmentary detail view of the record inverting pulley and cable mechanism shown as a portion of the assemblage in Fig. 13.

Reciprocatory movement of the shaft 44 results from a disc 77 mounted fast on one end portion of said shaft and carrying a lever 78 whose lower end portion is secured to a lever 79 (see Fig. 2). The last-mentioned lever has its inner end pivotally mounted on the frame and its opposite end carries a cam roller 80 adapted to engage the eccentric surface of a cam 81 also fast on the cam shaft 62. Obviously, when the cam 81 is turned in the proper direction, the outer end of the horizontal lever 79 is forced downwardly, pulling downwardly on the upright lever 78 whereby, through the disc 77 the shaft 44 is reciprocated in a desired direction. Return upward movement of the lever 79 is caused by an attached coiled spring 79' and this keeps the cam roller 80 engaged with the cam 81, at the same time exerting such pressure as will cause the lever 78 and the disc 77 to raise the gripper arm assembly on the shaft 44 after the assembly has dropped counter-wise behind the stack of records in the drawer. When the gripper arm assembly has been raised upright and has engaged an elevated record, the combined weight tends to cause the arms to swing downwardly toward the turntable, restrained only by the action of the cam 81 against the cam roller 80. The cam 81 is so shaped as to cause the gripper arm assembly on the shaft 44 to carry the record 26 engaged from the block 27 in the manner shown in Fig. 4 and to swing the record downwardly until it rests on the phonograph turntable 54. A continued turning movement of the cam 81 is effective, through the connections described, to cause the gripper mechanism to raise the record from the phonograph turntable (after the top surface thereof has been played) and, according to the type of album being played, as will hereinafter appear, the gripper mechanism will either return the engaged record to the turntable after inverting it, or, it will swing the record back over the entire stack of records and release it and then rise to a position to engage a new record which has been elevated by the block 27 and associated mechanism. Should the machine be turned off, as will be dealt with more fully hereinafter, the cycle of movement is always terminated with the gripper arms in upright position to await the new record raised from the stack in the record drawer 21. For all types of record albums it is necessary that after the played record is automatically removed from the phonograph turntable 54, it be inverted immediately. The mechanism for accomplishing this function is shown in Figs. 13 and 14. It will be observed that one of the stud shafts 49 carrying a gripper pad 50 is extended and the extended portion thereof has fast thereon a pulley 82. Projecting laterally from the inner face of the pulley 82 is a pin 83 adapted to contact the bracket 48. A portion of the horizontal support 35 of the machine has attached thereto the lower end of a cable 84 whose upper end portion is secured to the pulley 82, as at 85, and which is extended beyond the point of securement with the depending extension of the cable carrying a small weight 86. When the arms 45 of the gripper mechanism are in the substantially horizontal position of Fig. 2, the cable 84 will be slack. A spreading of the arms 45 of the gripper mechanism to an extent to disengage the pads 50 from the record to release the record upon the phonograph turntable also resulted in a condition wherein the weight 86 exerted a pull on the cable 84 sufficient to cause the pulley 82 to revolve sufficiently to effect a winding on the pulley of some of the slack in the cable 84, with such movement of the pulley being terminated by engagement of the pulley stop pin 83 with the inner surface of the bracket 48. It should be observed that until such time as the gripper arms release the record, the small weight 86 exerts an insufficient pull to overcome the inertia of the record gripped between the pads 50. When, during the sequence of operations, the arms 45 move, to effect a gripping engagement between the pads 50 and the edges of the phonograph record and swinging movement of the gripping mechanism lifts the record from the phonograph turntable, the cable 84 will gradually tighten as the arms 45 rise, causing the pulley 82, the pad 50 and the engaged record to be revolved by the pull exerted by the cable 84. The movement is such that by the time the arms 45 are substantially upright, the engaged record will have been turned through 180° and is in substantially horizontal position above the stack of records in the drawer 21. Actually, for this type of movement, the record engaged twists its way over the stack of records in the drawer without contacting any of them.

If the movement of the control cam 81 is such as to move the gripper mechanism arms 45 forwardly so as to deposit the inverted record back on the phonograph turntable immediately, the cable 84 slackens as this movement is accomplished and hence imparts no turning movement to the pulley 82. By this arrangement the engaged record is returned to the phonograph turntable while practically horizontal. As the leading edge of the record engages the phonograph turntable 54 beyond the center spindle 56, the record will be straightened out, with such movement being permitted by the turning pads 50 and subsequently the record is released in flat condition onto the phonograph turntable with its center aperture engaged by the turntable spindle 56.

On the other hand, if the movement of the control cam 81 has been selected to effect discarding of the engaged record, then the gripper arms 45 are caused to continue their swing in a rearwardly directed arc over the stack of records in the drawer to a position behind such stack. During this movement, the cable 84 becomes very taut with the result that the pulley 82 and pad 50 are turned sufficiently far to cause the engaged record to have been turned through an arc of 270° at the time it is released and thus the released record is in substantially vertical position adjacent a proper instrumentality laterally of the stack of records in the drawer 21.

Within the upper portion of the cabinet 20, associated with the record drawer 21 and immediately to the left thereof relative to Figs. 1 and 2, is a record stacker which successively receives individual records following reproduction of the surfaces thereof by the phonograph and releases the same to the rear of the records stacked in the drawer 21. By reference to Fig. 10, it will be observed that there are mounted on the upper surface of the partition 35 a pair of brackets 87 in which are journalled the reduced rounded extremities of a squared shaft 88, the latter extending fore and aft relative to the cabinet. A rack 89 having an upwardly angled main supporting portion 89' and a forward lip 89'' at an obtuse angle to the plane of the inner surface of the portion 89', is affixed to the shaft 88. The extension portion 89'' of the rack, as well as an adjoining portion of the rack 89', are of a width slightly less than the distance between slip rod extensions 24', so that said portions of the rack may oscillate between the slip rod extensions. The rear face of the rack portion 89' carries an extension 90 (see Fig. 2) and a coiled spring 91 connected between the extension 90 and a portion of the cabinet or frame yieldingly retains the rack in the rearwardly tilted position of Fig. 2. An upstanding block 93 serves as a stop or check. Affixed to a rear face of the shaft 88 toward the inner end of said shaft is an arm 94 which projects angularly, upwardly and to the outer end of which is pivotally connected one end portion of an elongated substantially horizontally disposed lever 95. The outer end portion of said lever 95 is formed with a downturned hook 96 adapted to ride on the upper surface portion of a wheel 97 carried fast by the shaft 44. The wheel 97 is eccentric in shape and additionally, is formed with a shoulder 98, as will appear most clearly from Fig. 5. The location of the shoulder 98 on the eccentric wheel 97 is such that during movement of the shaft 44 during the portion of its movement which is effective to swing the gripper mechanism assembly to the farthest point of travel behind the stack of records, the shoulder 98 will engage the hooked extremity 96 of the lever 95. Then, reverse reciprocation of the shaft 44, moving the wheel 97 with it, will pull the lever 95 in a direction toward the left relative to Fig. 5, because of the engagement of the hooked end of the lever with the wheel shoulder 98, and this, through the connection 24, will impart a reverse oscillation to the shaft 88 which will rock the record rack 89 forwardly to a position wherein the rack lower extension 89'' will drop below the level of the slip rod extensions 24' before the main rack portion 89' assumes a vertical position. Assuming that a record has been deposited onto the rack 89, it will then be evident that the lower edge of such record is engaged by the slip rod extensions 24' with the result that the record slides downwardly onto the main slip rods 24. With continued forward tilting of the rack 89, the record being operated on first assumes a vertical position and then tilts to the other side of vertical with the result that it will gravitate against the rear face of the stacked records in the drawer 21.

At the moment the operation last described takes place, the eccentric wheel 97 will have turned sufficiently far to cause disengagement of the lever hook 96 from the wheel shoulder 98, whereupon the spring 91 in exerting its contracting force, will reversely tilt the rack 89 to its normal position of Fig. 2. It should be noted that the spring 91 is sufficiently strong to keep the rack in its rearwardly tilted position regardless of the weight of a group of records placed upon the rack. As the rack is returned to the position of Fig. 2 with some force due to the spring 91, a snubbing device 99 (see Fig. 9) is provided. The relative location of said snubbing piston will be clear from Fig. 7 and a piston 100 rides in a vertical cylinder 101. On the bottom of the piston is a flap 102 whose opposite free peripheral portions control ports 103 in the piston 100. Projecting upwardly from the piston 100 is a piston rod 104 having its upper end portion pivotally connected to the squared shaft 88, as at 105. Due to the action of the flapper portions 102 relative to the valve ports 103, upward movement of the piston 100 during the forward tilting of the rack 89 is accomplished without resistance. However, upon release of the hook 96 from the wheel shoulder 98 and the immediate action of the spring 91, the flapper 102 will then cover the valve ports 103 in the snubbing cylinder piston and trapped compressed air escapes slowly through a small vent 106. Hence, the piston 100 may only recede or lower in its cylinder 101 very slowly, and through the connection of the piston rod 104 and other interconnected parts, the rearward tilting of the entire rack assembly is effectively checked or snubbed.

It has heretofore been pointed out that the improved automatic record-changing mechanism is very versatile and adaptable. As will be evident from preceding explanatory matter, the operation of the mechanism for playing records of the "turnover" album type will be evident as each record of such an album must be reversed after the playing of the first side thereof and then the second side of each record is played. The preceding explanation will also make it evident that the improved record changer is adaptable to records of the "automatic" album type in which each record of a series or album is played on one side and is then deposited on the rack 89 in a reverse manner and gradually gravitated toward the front of the stack in the record drawer 21 for ultimate reproduction of the reverse sides of the successive records. We will now deal with the playing of records of the so-called "drop automatic" albums.

Each record is played on only one side first whereupon the records are restacked in reverse order and then the other sides of the same are played. For records belonging to the "drop automatic" series it is necessary that the stacker assembly be rendered inactive to allow the successive records, after the first surfaces thereof have been successively played, to pile up in the stacker, one in front of the other, instead of permitting such records to individually return to the record drawer where they stack up one behind the other, according to a method previously described.

Figure 3:
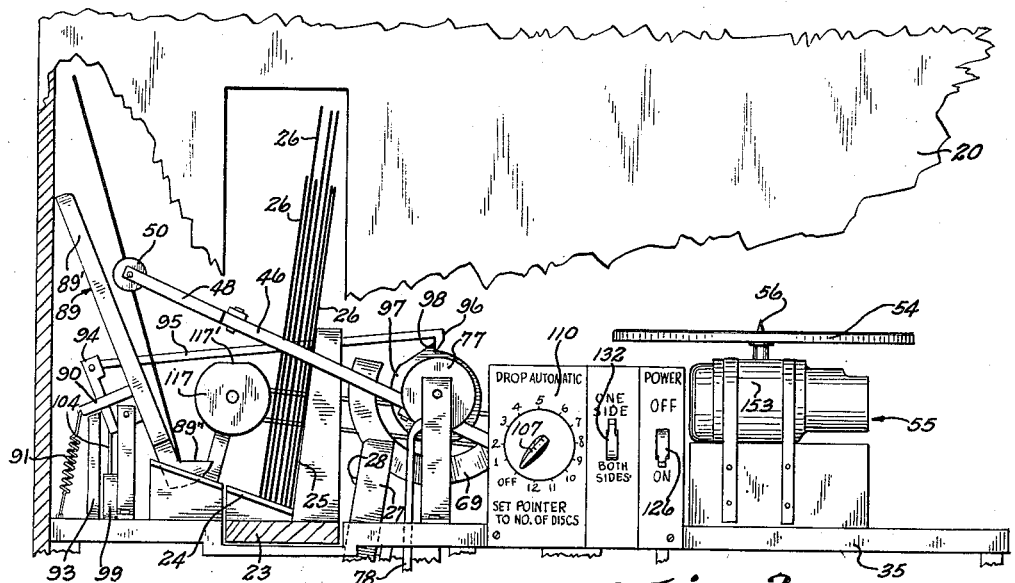
Fig. 3 is a fragmentary view, with parts in section, similar to the showing in the upper portion of Fig. 2, only illustrating the position of the record shifting mechanism following removal of a record from the phonograph turntable and disposition of the same adjacent the record drawer.

In order to have the mechanism operate for records of the "drop automatic" series, a switch mechanism, later to be described, will be manipulated. A control knob 107 on the front of the cabinet is turned to an indicated position and said control knob, being fast on the end of a shaft 108 turns said shaft (see Fig. 5). Fast on the shaft 108 is a ratchet 109 provided with the same number of teeth as there are numerical designations on the control panel 110 for the knob 107, and the numbers indicated on the control panel represent the number of records to be played in the "drop automatic" series. The ratchet 109 is engaged by a pawl 111 carried by the disc 77 which is fast on one end of the shaft 44. At the inner end of the ratchet shaft 108 is mounted fast a small pulley 112 connected by an endless belt 113 with a similar pulley 114. A supporting bracket 115 secured to the upper partition 31 has journalled therein a stud shaft 116 which carries the pulley 114 as well as a disc 117. The disc 117 is formed with a flattened surface portion 117' (see Figs. 3 and 4) located immediately below the lever 95 at such times as the control knob 107 is turned to the "off" position on the control panel 110. At such time the pawl 111 is in a position on the ratchet wheel 109 to engage a portion thereon where one ratchet tooth is eliminated (see Fig. 5) with the result that when the control knob is at the "off" position, the pawl 111 is ineffective so far as moving the ratchet 109 is concerned.

It is intended that the operator turn the control knob 107 to a numerical designation on the panel 110 to correspond with the number of records of the "drop automatic" series which are in the drawer 21 for reproduction. Such movement of the control knob, through the shaft 108 and ratchet 109, transmitting this turning movement from the pulley 112 to the pulley 114 will turn the disc 117 to remove the flattened surface portion 117' thereof from below the lever 95. Consequently, at such time the disc 117 will function as a cam, raising the lever 95 to remove the hooked extremity 96 out of the range of movement of the cam 97 so that the hooked extremity of the lever 95 cannot be engaged by the shouldered portion 98 of the cam 97.

The movements just above described prepare the mechanism for subsequent actions and then through the mechanism previously described, the forwardmost record 26 in the stack in the drawer 21 is engaged by the record gripper arm mechanism 48 and is deposited onto the turntable 54 of the phonograph with the proper surface uppermost for reproduction. During such deposit of the record onto the phonograph turntable through the connections described, the pawl 111, in engagement with the ratchet wheel 109, moves the ratchet wheel 109 a distance equal to the distance between two adjacent teeth on the ratchet wheel so that the control knob 107 on the face of the cabinet will now point to a number on the dial 110 one less than it pointed to originally.

When the surface of the record on the phonograph turntable has been played, the gripper arm mechanism will function to remove the record from the phonograph turntable and will deposit it, in inverted condition, on the stacker rack 89. However, it should be borne in mind that the lever 95 is at such time in a raised condition whereby forward tilting of the rack 89 is prevented, and it remains in the position of Fig. 2. At the same time the then forward record in the drawer 21 is elevated and is swung onto the phonograph turntable 54. Following reproduction of the exposed surface of the second record on the phonograph turntable, said record is transferred in inverted condition to the stacker rack 89, being deposited in front of the previous record deposited onto the rack 89. This sequence of operations continues until the last record of the series is removed from the drawer 21 and is transferred to the phonograph turntable. Thereupon, the pawl 111 is in engagement with the last tooth on the ratchet 109 ahead of the break in the ratchet teeth, and after that, stepped movement of the ratchet 109 is terminated. At such time the control knob 107 will have been returned to its "off" position, and by means of the connected pulleys 112 and 114, the disc 117 will have been turned to a position wherein its flattened surface 117' again directly underlies the lever 95 so as to permit hooking engagement between the end 96 of the lever and the shoulder 98 on the cam 97. It is recalled that during the operations described all of the records of the "drop automatic" series, following successive reproduction of the first surfaces thereof, will be stacked on the rack 89, inverted, and with the first played record innermost, etc. The spring 91, associated with the rack extension 90, is sufficiently strong to hold the rack 89 in its rearwardly inclined position even when it is bearing the load of the stack of records. However, due to the fact that the lever 95 now rides on the cam 97, the hook 96 is quickly engaged by the cam shoulder 98 to exert a pull on the lever 95 whereby, through the means previously described, the stacker rack 89 is tilted forwardly so as to deposit the entire stack of records it contained onto the slip rods 24 of the drawer 21 and against the retaining poles 25. The sequence of surfaces now to be played will be understood and thereafter, the lifting mechanism and the record gripper mechanism function to successively present the newly stacked records to the phonograph turntable. The first record side to be played is actually the reverse face of the last record played before the restacking, and so on, a condition peculiar to records of the "drop automatic" series. Following the playing of the reverse side of each record in the order and arrangement noted, each record is successively transferred from the phonograph turntable to the rack 89 which is then permitted to function in its normal manner to return each completely played record to the record drawer 81. After completion of the playing of the entire album, the stack of records may be conveniently removed by pulling the drawer 21 outwardly, making the apparatus ready to receive new records or albums of records.

The movable parts of the improved record-changing mechanism are electrically actuated and controlled. For purposes of illustration, there have been shown schematically in Fig. 15 the various elements which are influenced by the electrical system as well as the wiring diagram. The numeral 118 indicates an electrical cord or cable containing a pair of circuit wires and carrying at its outer end a plug 119 adapted for connection with a conventional household electrical socket or other outlet. A portion of the cable 118 is intersected by a knife switch 120, one element of which is carried by an arm 121 pivotally mounted on the shaft 44, and the other element of which is carried by the gripper mechanism arm 46 (see Fig. 13). Pivotal movement of the arm 121 is restrained by a spring 122 extended between the arms 46 and 121, the spring normally causing the arm 121 to follow the movement of the arm 46. Pivotal movement of the arm 121 is limited by a stop 123 shown in Fig. 13. Should there be any mechanical difficulty or error in the mechanism which might result in a failure to present a record to the gripper arms 45, the Y member 69 would then fail to exert a force on its lower extent 69' and the gripper arms 45 would move toward a closing position. Without a record being present to be engaged, the arms would close further than necessary to engage a 10-inch or small size record and such movement of the arm 46 carrying the knife switch 120 would cause an opening of the switch and a break in the circuit because the stop 123 would prevent the short arm 121 from completely following the movement of the switch-carrying arm 46. Thus, the circuit would be broken, preventing further movement of elements of the assemblage and preventing damage to records.

From the switch element on the arm 121 the electrical cord 118 is extended to a contact point on a pivotally mounted lever 124. As will be seen from Fig. 2, the lever 124 mounted in the cabinet for pivotal movement has an intermediate portion thereof which moves relative to an upright post 125 having a contact point thereon from which extends a portion of the interrupted electrical cord 118.

A main control switch 126 intersects circuit wires 127 and 145. In practice, said main control switch 126 is located on the front of the cabinet adjacent the control panel, as will appear from Figs. 1, 2, 3 and 4. When the main control switch 126 is moved to its "on" position, a link 128, extended between the switch 126 and the lever 124, (see also Fig. 5) imparts a lifting movement to the outer end of the lever 124, thereby engaging the contact elements on the members 124 and 125 and closing the otherwise broken extent of the main current-carrying cord 118.

The outer end of the lever 124 carries a depending pin 129 adapted to engage and disengage a recess 130 therefor in a revolubly mounted disc 131, it being understood that when the mechanism is not in operation the lever 124 is in its lowered position with the pin 129 engaging the stop recess 130 in the disc 131. If, during the reproduction of a phonograph record, the main control switch 126 should be turned to its "off" position, the lever 124 will be held in a raised positioned disengaged from the disc 131, but the contact points on members 124 and 125 will be in engagement to keep the circuit through cord 118 closed. Only when the record being handled has been returned to the record drawer 21 can the pin 129 drop into the stop recess 130 of the disc 131 and effect such movement of the lever 124 as will break the circuit. This is a safety feature which prevents the possibility of leaving records in the machine and insures the operation of the machine until all of the records are returned to the record drawer 21.

Figure 11:
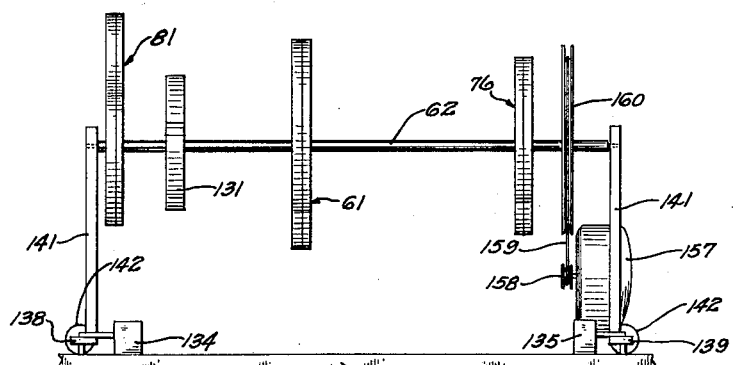
Fig. 11 is a fragmentary detail view, taken at right angles to the showing in Fig. 2, of the operating motor, the cam shaft and the cams thereon for effecting the desired movements of the operative parts of the assemblage.
Figure 12:
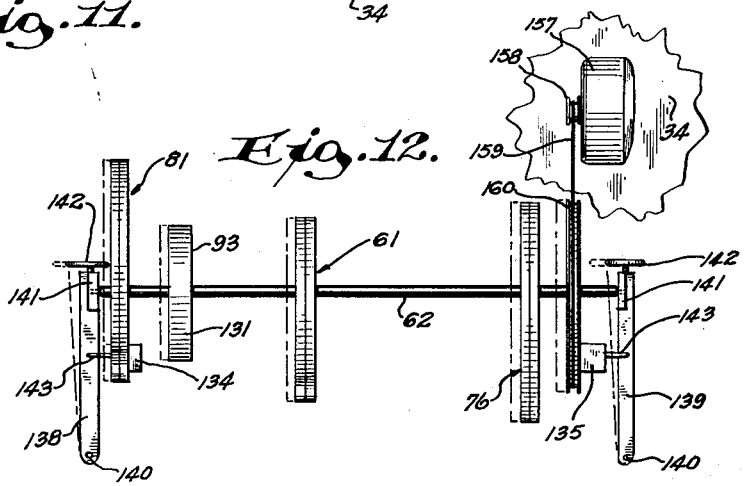
Fig. 12 is a fragmentary plan view of the showing in Fig. 11.

As will be observed from Figs. 1, 2, 3 and 4, there is also on the front of the cabinet 20, associated with the control panel 110, a switch 132 which may be manually manipulated from one position to another, and which, through the controls and mechanism influenced thereby provides for the playing of a selected phonograph record on either one side thereof or on both sides thereof in succession. The switch 132 is connected to a wire 133 which is extended off of the main current carrying cord 118 and depending upon the position of said switch 132 it will energize either of the solenoids 134 or 135 through engagement with either of wires 136 or 137 respectively. Said solenoids 134 and 135 are mounted respectively on arms 138 and 139 (see also Figs. 11 and 12) and said arms are pivotally mounted at one pair of ends on the base 34 of the cabinet, as at 140 in Fig. 2. Said arms 138 and 139 extend parallel to the base 34 and their free ends have mounted thereon the bases of upright supports 141 which carry the cam shaft 62 previously referred to. The free ends of the horizontal arms 138 and 139 carry base engaging rollers 142 to facilitate swinging movement of said arms. Whichever solenoid, 134 or 135, has been energized by the throw of the switch 132, will cause recession of its core 143, pulling the particular base arm to which such core is fastened, and thus axially shifting the entire cam shaft 62 a small amount in the required direction.

As has been noted heretofore, there are on the cam shaft 62, besides the recessed disc 131, cams 81, 61 and 76. Each one of the latter cams is in fact formed of a pair of adjacent sections, as will appear from Figs. 11 and 12, and one set of such cam sections will cause a selected record to be turned over each time before discard, whereas the other set of cam sections will cause the record after being played to be immediately discarded. Predetermined sections of cams are selectively effective because the cam rollers are not susceptible of axial movement and are of a length to correspond to the thickness of a single cam section. Hence, through an axial shifting of the cam shaft 62 in either direction by virtue of the swingable arms 138 and 139, certain cam sections can be engaged with the respective cam rollers according to the will of the operator and in accordance with the manipulation of operating members on the instrument control panel 110.

Figure 15:
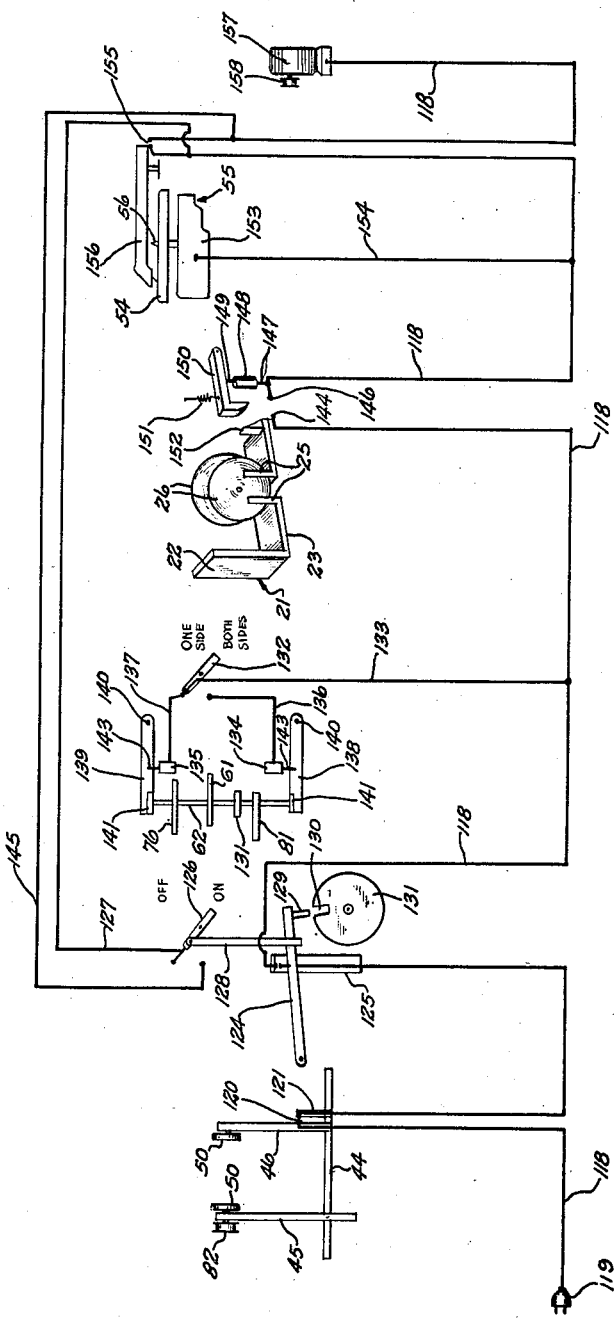
Fig. 15 is a schematic view of the essential devices of the entire assemblage, together with a wiring diagram of the electrical circuits and controls.

From Fig. 15 it will be observed that the main current carrying cord 83, beyond the circuit wire 133, extends to and connects with a contact element 144 on the floor of the record drawer 21. The arrangement is such that the circuit to operate the mechanism will only be completed when the drawer 21 is in its fully closed position. This results from the fact that the current-carrying cord 118 is broken within the cabinet and at the rear of the cabinet a continuation of the cord 118 engages a contact element 146 which is adapted to be met by the drawer-carried contact element 144 only when the drawer is in its completely pushed in position. From the cord 118, beyond the contact element 146, is an electrical connection 147 which is adapted to energize a solenoid 148 when the drawer is closed. The core 149 of the solenoid 148 is attached to a pivotally mounted arm 150 and when the solenoid core 149 is retracted, there will be a down pull on the outer end of the arm 150 against the tension of the coiled spring 151. Obviously, the arm 150 may only be pulled down when the drawer 21 is completely closed with the circuit through the contact elements 144 and 146 completed. When the arm 150 is in its lowered position, it engages over a lug 152 mounted on the rear of the floor 23 of the drawer. This hooking engagement continues as long as the contact elements 144 and 146 are in engagement with the result that it will be impossible to withdraw the drawer 21 until the main control switch 126 is turned to its "off" position. With the drawer in its closed position current will continue to flow so as to energize the solenoid 148 because of the action of the cam 131, the lever pin 129 and the lever 124.

Beyond the connection with the solenoid 148, the cord 118 has an extension 154 tapped off which is connected with the phonograph motor 153 which operates the turntable 54, and current to the motor 153 is supplied at all times when the various contacts and switches previously described are properly closed. The cord 118 is also intersected by a switch 155 on the phonograph pickup arm 156. Beyond the switch 155 an end of the circuit wire 145 is connected with the cord 118 and ahead of the switch 155 an extremity of the circuit wire 127 connects with the cord 118, said wires 127 and 145 being in the circuit controlled by the main control switch 126 previously referred to. The cord 118 ultimately terminates at and energizes an electric motor 157 whose motor shaft carries a small pulley 158 connected by a belt 159 with a large pulley 160 mounted fast on the cam shaft 62 (see Figs. 5, 11 and 12).

The interruption of the current-carrying cord 118 by the phonograph pickup arm 156 is a conventional contact arrangement whereby the needle in the pickup arm, encountering eccentric grooves in the phonograph records adjacent their midportions, closes the switch 155 to energize the motor 157. The motor then functions to effect the reversing or the changing of the phonograph record, and when the pickup arm 156 once again has its needle in engagement with the grooves on the outer portion of the record received, the switch 155 will be open, breaking the circuit to the motor 157.

In the event that the main control switch 126 is moved to its "off" position during the performance of a phonograph record, the wires 127 and 145, controlled by the switch 126, will then be connected and such connection serves to short circuit the phonograph pickup arm switch 155 with the result that the motor 157 operates immediately.

A record may be rejected (i. e. removed from the phonograph turntable 54 while it is being reproduced) without stopping subsequent performances. This is accomplished by moving the switch 126 to its "off" position whereby the pickup arm switch 155 will be short circuited, as previously described, so that the motor 157 will immediately operate to turn the cam shaft 62.

During normal operation of the mechanism, the motor 157 functions to raise the phonograph pickup arm 156 by means conventional in the art. With a raising of the pickup arm 156, the switch 155 is closed, whereupon the main control switch 126 may be returned to its "on" position with the result that the reproduction of other records in the drawer will continue.

Summary

The improved record changing mechanism, as associated with a phonograph or record player housed in a console cabinet, has been described in detail. At this point a generalization as to the novel and advantageous features of the various instrumentalities making up the entire assemblage will be given.

The record drawer

The record drawer 21 constitutes an extremely convenient loading and holding magazine for individual records to be played or for records in stacks, series, or albums of various types. The drawer moves inwardly and outwardly from the front of the cabinet and records may be deposited therein quickly and easily. The rack, mounted on the floor of the record drawer, is so arranged that the withdrawal of the forwardmost record in a stack results in a gravitation or slipping of the other records therein into an advanced position ready for the withdrawal of the then forward record. The drawer while susceptible of holding one or many records in position for ultimate engagement by the lifting mechanism, can hold either small or large records, or an assortment of the same. An advantageous feature related with the drawer is that when the drawer is in its withdrawn or open position, the electrical circuit operating the machine is broken with the result that the machine cannot be operated until the drawer has been fully closed. When the drawer is fully closed and the machine is operating, the drawer is automatically locked in its inner position until such time as the main control switch is turned to its "off" position to shut off the supply of current. The drawer is additionally conveniently laterally associated with the improved record stacking rack in the manner to gather series of records after surfaces of the same have been played, and upon conclusion of performance of an entire series of records, the same will be found in the drawer for convenient removal from the machine when the drawer is opened.

The record lifting mechanism

When the machine is not in operation the lifting mechanism is disposed in an out of the way position so that it will not interfere with the movement of the record drawer. The block and spur member of the lifting device is automatically moved adjacent the forwardmost surface of the forwardmost record in the drawer, which is the first surface to be reproduced by the phonograph, and in the movement of the block to effect elevation of a record from the record drawer, the block and spur will enter the central aperture in the engaged record, regardless of the size of the record. Each record engaged by the block and spur device for elevation is elevated to a set or predetermined height which is a point on an arc between the center hole of the record (any size) and the phonograph turntable spindle. After the lifting device has completely elevated a record from the stack in the record drawer followed by engagement of the record by the record gripping and moving mechanism, the block and spur member recedes to a lowered position without engaging the face of the then forwardmost record in the drawer and, until it is called upon to again function to elevate a record, said block remains in an out of the way lowered position so as not to interfere with the movement of the record drawer.

The gripper mechanism for engaging and moving a selected record

The movable arms in this mechanism, which function after the block and spur lifting device, carry resilient pads which engage opposite peripheral portions of a record, without damage to the record, and the arms are so constructed that the pads thereon will always be parallel to each other regardless of the distance therebetween. The arms, which carry these pads, are pivotally mounted on a common shaft, and the shaft is oscillatable so that the arm-carried pads, and any record engaged between the same, may be swung along the line of an arc described between the turntable spindle and the position of the center hole of the record in its maximum raised position. Due to the fact that the swingable arms have stud shafts on which the pads are mounted, a small sized record may be swung over and behind the record stack in the record drawer even though the record drawer contains protruding large size records. The pad-carrying arms, when carrying a record and moving toward the phonograph turntable, function to present the record horizontally exactly centrally over the turntable spindle following which the arms release the record. The arms also function, after the reproduction of the surface of a record on the turntable, to again engage opposite edges of the played record and to automatically swing the same away from the turntable, inverting the record engaged by automatically functioning means associated with one of the record engaging pads. After the engaged record has been inverted, according to the choice of the operator, the movable arm assemblage is capable of either returning the inverted record to the phonograph turntable for performance of the reverse side of the record, or the arms may continue their reverse swinging movement so as to carry the record over the stack of records in the drawer, whereupon such record is released onto the stacker rack.

The record stacker rack

The stacker rack 89, located laterally of the record drawer, constitutes an operable receptacle for records released by the record gripping arms after performance of the records on the phonograph turntable. According to the choice of the operator as indicated by a control member, the stacker rack will function to immediately transfer successive individual records received by it to the record drawer adjacent the rear of the stack of records in the drawer or, the rack will remain inoperative until a predetermined number of records are received by it whereupon such stack of accumulated records are transferred together into the record drawer. By virtue of the trip device which controls movement of the stacker, rocking of the stacker can be terminated for a desired period of time whereby played records accumulate in the rack in reverse order relative to the order in which they were initially placed in the record drawer. As is the case with the record drawer, the stacker rack will receive and accommodate phonograph records of either standard size, or a mixture of both.

Switch mechanisms

Safe operation of the entire assemblage is guaranteed by the safety switch which will cut off the entire power supply in the event of failure of the lifting mechanism to elevate a record from the drawer to the record engaging and moving mechanism, or in the event that the latter mechanism fails to properly grasp a record. Also, it should be noted that if the main power switch is turned to its "off" position during the operation of the mechanism or while a record is being played, the power neverthelsss is continued to operate the mechanism until such time as all of the records are back in the record drawer, whereupon the power supply then automatically cuts off.

Versatility of the assemblage

The improved record changing mechanism is adapted, at the will of the operator, to handle series of records of the "turnover" type, or of the "automatic" type, or of the "drop automatic" type. This will be thoroughly appreciated from the previous description of the parts, and it will be recalled that at the selection of the operator, the mechanism will function, after the performance of a surface of a record, to invert the record and to then either replace the record immediately upon the turntable of the phonograph, or to swing the record over the drawer and to place it in the stacker rack. Depending upon the type of record series or album being performed, and the setting of the control mechanism, the stacker rack then functions automatically either to immediately transfer the record to the record drawer, or to hold the record until a predetermined number of records have been accumulated in the rack, in reverse order, whereupon the entire stack of accumulated records is transferred to the record drawer.

With the improved automatic record changing mechanism consecutive performance of all available types of series of phonograph records is attainable without individual attention during the performance of such series of records. The improved mechanism is easily loaded and unloaded, operated and controlled, and is well adapted for the purposes described.

What is claimed as the invention is:

1. In an automatic record changer, in combination, an open-sided record magazine wherein records are stacked in a predetermined order, a phonograph turntable, a record rack movably mounted adjacent and operative in the open side of said magazine, an elevator for successively moving individual records from the magazine to a station intermediate the turntable and rack, a swingable record transfer member selectively movable between the turntable and the rack and operative at said station for record engaging purposes, record clamping and turning members carried by said transfer member, said transfer member when adjacent said turntable being adapted to deposit a transferred record thereonto or to remove a record therefrom, and being adapted, when adjacent the rack to deposit a carried record onto said rack, and timed means for moving said rack to cause it to deposit its contents into said magazine.

2. In an automatic record changer, in combination, an open-sided record magazine wherein records are stacked in a predetermined order, a phonograph turntable, a record rack movably mounted adjacent and operative in the open side of said magazine, an elevator for successively moving individual records from the magazine to a station intermediate the turntable and rack, a swingable record transfer member selectively movable between the turntable and the rack and operative at said station for record engaging purposes, record clamping and turning members carried by said transfer member, timed and selective means for causing said record clamping members to releasably engage opposite peripheral portions of a record and to turn the record through a desired arc, said transfer member when adjacent said turntable being adapted to deposit a transferred record thereonto or to remove a record therefrom, and being adapted, when adjacent the rack to deposit a carried record onto said rack, and timed means for moving said rack to cause it to deposit its contents into said magazine.

3. In an automatic record changer, in combination, an open-sided record magazine wherein records are stacked in a predetermined order, a phonograph turntable, a record rack movably mounted adjacent and operative in the open side of said magazine, an elevator for successively elevating individual records from the front of the stack in the magazine to a station intermediate the turntable and rack, a swingable record transfer member selectively movable in either direction between the turntable and the rack or between intermediate points and operative at said station for record engaging purposes, record clamping and turning members carried by said transfer member, timed and selective means for causing said record clamping members to releasably engage opposite peripheral portions of a record and to turn the record through a desired arc, said transfer member when adjacent said turntable being adapted to deposit a transferred record substantially horizontally thereonto or to remove a record therefrom, and being adapted, when adjacent the rack to deposit a carried and inverted record onto said rack, and timed means for moving said rack to cause it to deposit its contents into said magazine.

4. In an automatic record changer, in combination, an open-sided record magazine wherein records are stacked in a predetermined order, a phonograph turntable, a record rack movably mounted adjacent and operative in the open side of said magazine, an elevator for successively elevating individual records from the front of the stack in the magazine to a station intermediate the turntable and rack, a swingable record transfer member selectively movable in either direction between the turntable and the rack or between intermediate points and operative at said station for record engaging purposes, record clamping and turning members carried by said transfer member, timed and selective means for causing said record clamping members to releasably engage opposite peripheral portions of a record and to turn the record through a desired arc, said transfer member when adjacent said turntable being adapted to deposit a transferred record substantially horizontally thereonto or to remove a record therefrom, and being adapted, when adjacent the rack to deposit a carried and inverted record onto said rack, and timed means for moving said rack to cause it to deposit successively received individual records or an accumulation of inverted and inversely stacked records into said magazine.

5. The combination with a phonograph having a turntable and a plural record magazine remote from the turntable, means vertically reciprocal adjacent the front of the stacked records in the magazine to engage the forward record and elevate the record out of the magazine to an upper station, a pair of articulated record grasping arms mounted for joint swinging movement in an arc passing through said upper station and the center of the turntable, pads carried by the ends of said arms for engaging opposite edge portions of a record, and means for turning one of said pads to cause independent turning movement of an engaged record relative to said arms.

6. An automatic phonograph record handling mechanism, comprising a phonograph turntable, a magazine for records to be played on the turntable according to a predetermined sequence, a stacker rack movably mounted adjacent the magazine to transfer played or partially played records thereinto according to a predetermined plan, coordinated means to remove selected individual records from the magazine to transport the same to the turntable, means operative upon the reproduction of a surface portion of a record on the turntable to remove said record and invert it, selectively controlled means for either replacing such record on the turntable in inverted position or to deposit it in the stacker rack in inverted position, and selectively controlled means to cause the stacker rack to transfer individual records as received to the magazine or to accumulate a predetermined number of records stacked in inverse order and subsequently transfer a stack of records to the magazine.

7. In an automatic record changer, in combination, a record magazine wherein records are stacked substantially vertically in a predetermined order, a phonograph turntable, a record rack movably mounted adjacent said magazine to transfer played or partially played records thereinto, an elevator for successively lifting each successive forward record from the magazine stack to an elevated station lying on an arc intermediate the turntable and rack, a swingable record transfer member selectively movable in either direction between the turntable and the rack or intermediate points therebetween and operative at said station for record engaging purposes, record clamping and turning members carried by said transfer member, timed and selective means for causing said record clamping members to releaseably engage opposite peripheral portions of a record and to turn the record through a desired arc, said transfer member when adjacent said turntable being adapted to deposit a transferred record thereonto or to remove a record therefrom, and being adapted, when adjacent the rack to deposit a carried and turned record onto said rack, and timed means for moving said rack to cause it to deposit its contents into said magazine.

8. In an automatic record changer, in combination, an open-sided record magazine wherein records are stacked in a predetermined order, a phonograph turntable, a record rack movably mounted adjacent and operative in the open side of said magazine to transfer records thereinto, an elevator for successively moving individual records from the magazine to a station intermediate the turntable and rack, a swingable record transfer member selectively movable between the turntable and the rack and operative at said station for record engaging purposes, record clamping and turning members carried by said transfer member, said transfer member when adjacent said turntable being adapted to deposit a transferred record thereonto or to remove a record therefrom, and being adapted, when adjacent the rack to deposit a carried record onto said rack, means for releaseably holding said rack in a stationary, record-receiving position, and means for disengaging said rack holding means and moving said rack to cause it to dump its contents into said magazine.

9. In an automatic record changer, in combination, an open-sided record magazine wherein records are stacked in a predetermined order, a phonograph turntable, a record rack movably mounted adjacent and operative in the open side of said magazine to transfer records thereinto, an elevator for successively moving individual records from the magazine to a station intermediate the turntable and rack, a swingable record transfer member selectively movable between the turntable and the rack and operative at said station for record engaging purposes, record clamping and turning members carried by said transfer member, said transfer member when adjacent said turntable being adapted to deposit a transferred record thereonto or to remove a record therefrom, and being adapted, when adjacent the rack, to deposit a carried record onto said rack, means for releasably holding said rack in a stationary, record-receiving position, means for disengaging said rack holding means and moving said rack to cause it to dump its contents into said magazine, and electrical means for controlling said rack disengaging means and said rack moving means according to a predetermined timing.

10. In an automatic record changer, in combination, a phonograph turntable, a magazine drawer susceptible of holding a plurality of records of varying sizes in an upright stack, means for mechanically successively removing each forward-most record from the magazine, a record rack adjacent said magazine and communicating therewith, record engaging and transferring means thereafter movable between an advanced position of the record removing means and said phonograph turntable for engaging the forward-most record that the removing means has just removed from said magazine, said means also being movable between the turntable and said rack, record turning means associated with the record transferring means, and means for finally transferring a predetermined number of records from the rack to the magazine drawer.

11. The combination with a phonograph having a turntable and a plural record magazine remote from the turntable, a record collection receptacle, means for holding a stack of centrally apertured records in the magazine in substantially upright position, means vertically reciprocal adjacent the front of the stacked records in the magazine to engage the aperture of the forward record and elevate the record out of the magazine, means engageable with an elevated record and movable to deposit and release said record on the turntable, means to thereafter cause said record moving and depositing means to reengage said record, remove it from the turntable and to invert it, and selective means to thereafter cause said record moving means to return the record to the turntable in inverted condition or to deposit the removed record in said record collection receptacle.

12. The combination with a phonograph having a turntable and a plural record magazine remote from the turntable, a record collection receptacle, means for holding a stack of centrally apertured records in the magazine in substantially upright position, means vertically reciprocal adjacent the front of the stacked records in the magazine to engage the aperture of the forward record and elevate the record out of the magazine, means engageable with an elevated record and movable to deposit and release said record on the turntable, means to thereafter cause said record moving and depositing means to reengage said record, remove it from the turntable and to invert it, and selective means to thereafter cause said record moving means to return the record to the turntable in inverted condition or to deposit the removed and inverted record in said collection receptacle for subsequent operations.

JOSEPH FOX.

REFERENCES CITED

The following references are of record in the file of this patent:

UNITED STATES PATENTS

| Number | Name | Date |
| --- | --- | --- |
| 1,887,309 | Kincannon | Nov. 8, 1932 |
| 1,955,939 | Bishop | Apr. 24, 1934 |
| 2,137,276 | Erbe | Nov. 22, 1938 |
| 2,211,425 | Hussey | Aug. 13, 1940 |
| 2,300,779 | De Hart et al. | Nov. 3, 1942 |
| 2,313,262 | Pressley | Mar. 9, 1943 |
| 2,339,062 | Davis et al. | Jan. 11, 1944 |
| 2,348,766 | Wagner et al. | May 16, 1944 |